Patented Aug. 11, 1931

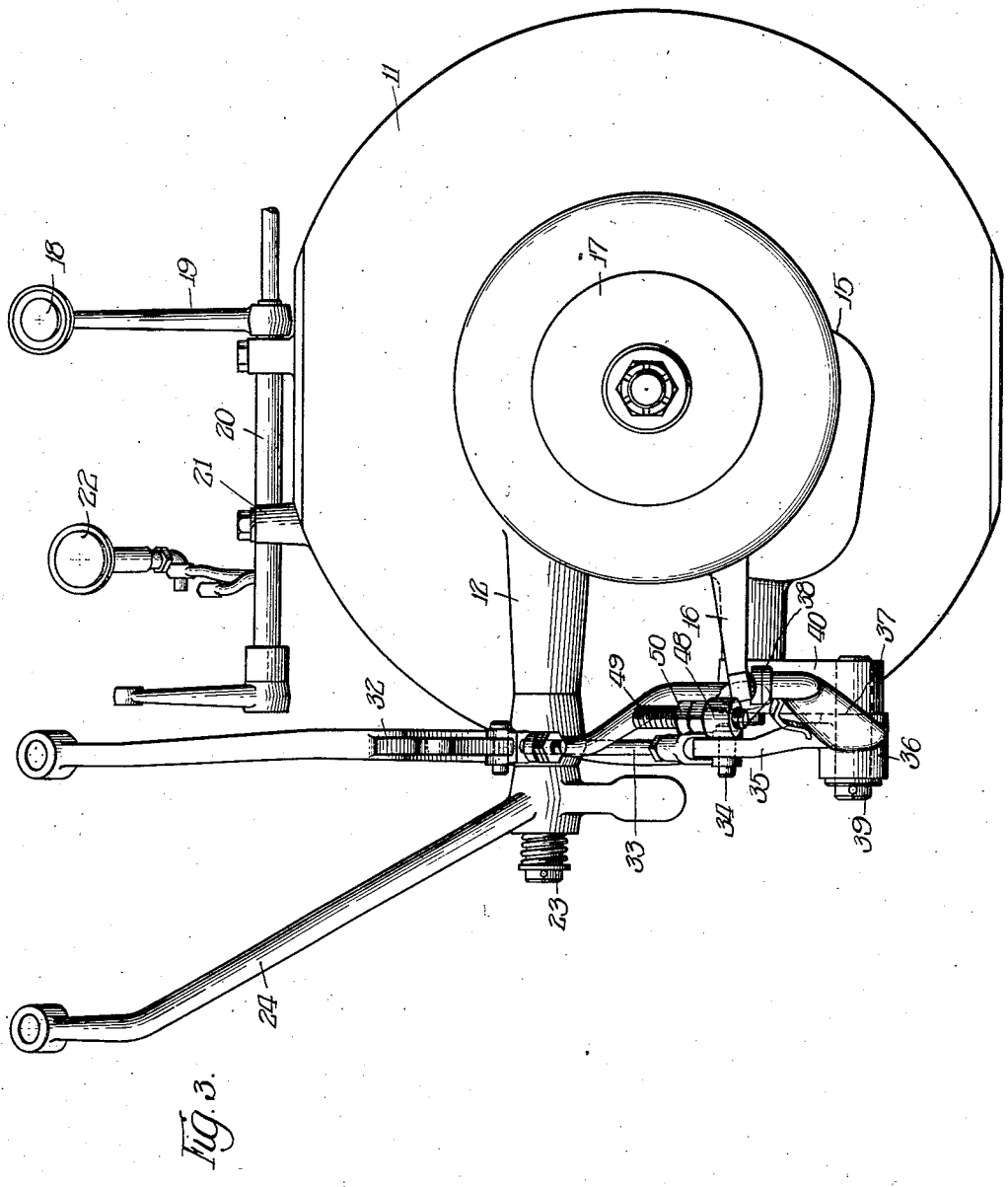

1,817,943

UNITED STATES PATENT OFFICE

EDWARD A. ROCKWELL, OF CHICAGO, ILLINOIS

BRAKE OPERATING MECHANISM

Application filed May 25, 1929. Serial No. 365,836.

This invention relates to new and improved brake operating mechanism and more particularly to such a mechanism associated with the brake pedal and adapted to provide a varying resistance to the operation of the pedal during the operating movement thereof.

The present invention is an improvement over my co-pending application, Serial No. 365,070, filed May 22, 1929. The principal difference consists in the provision of a resilient connection between the brake pedal and the pivoted sub-lever which carries the pivot for the brake applying lever to which the brake pedal is positively connected by a link.

This invention relates particularly to a type of construction adapted for use with motor vehicles in which the brake pedal normally has a depression of several inches in order to fully apply the brakes, although it may be used with other types of brake applying means. With modern types of four-wheel brakes, and especially with brakes of the servo type or with power operating means or boosters, there is the danger of a too sudden application of the brake, with the attendant possible injury to the machine and to the occupants.

It is an object of the present construction to provide brake operating mechanism so designed as to operate at low resistance over the range necessary for normal brake application and to have a largely increased resistance over an additional range for emergency or abnormal brake application.

It is an additional object to provide a construction in which the difference in force required is automatically varied in operation and is capable of adjustment to meet varying conditions.

It is also an object to provide a construction which is relatively simple in design and adapted for commercial manufacture and installation without material modification of existing designs of brakes and brake applying means.

Other and further objects will appear as the description proceeds.

I have shown one preferred embodiment of my invention in the accompanying drawings in which—

Figure 3 is a view of Figure 1 as seen from the right.

Figure 1:
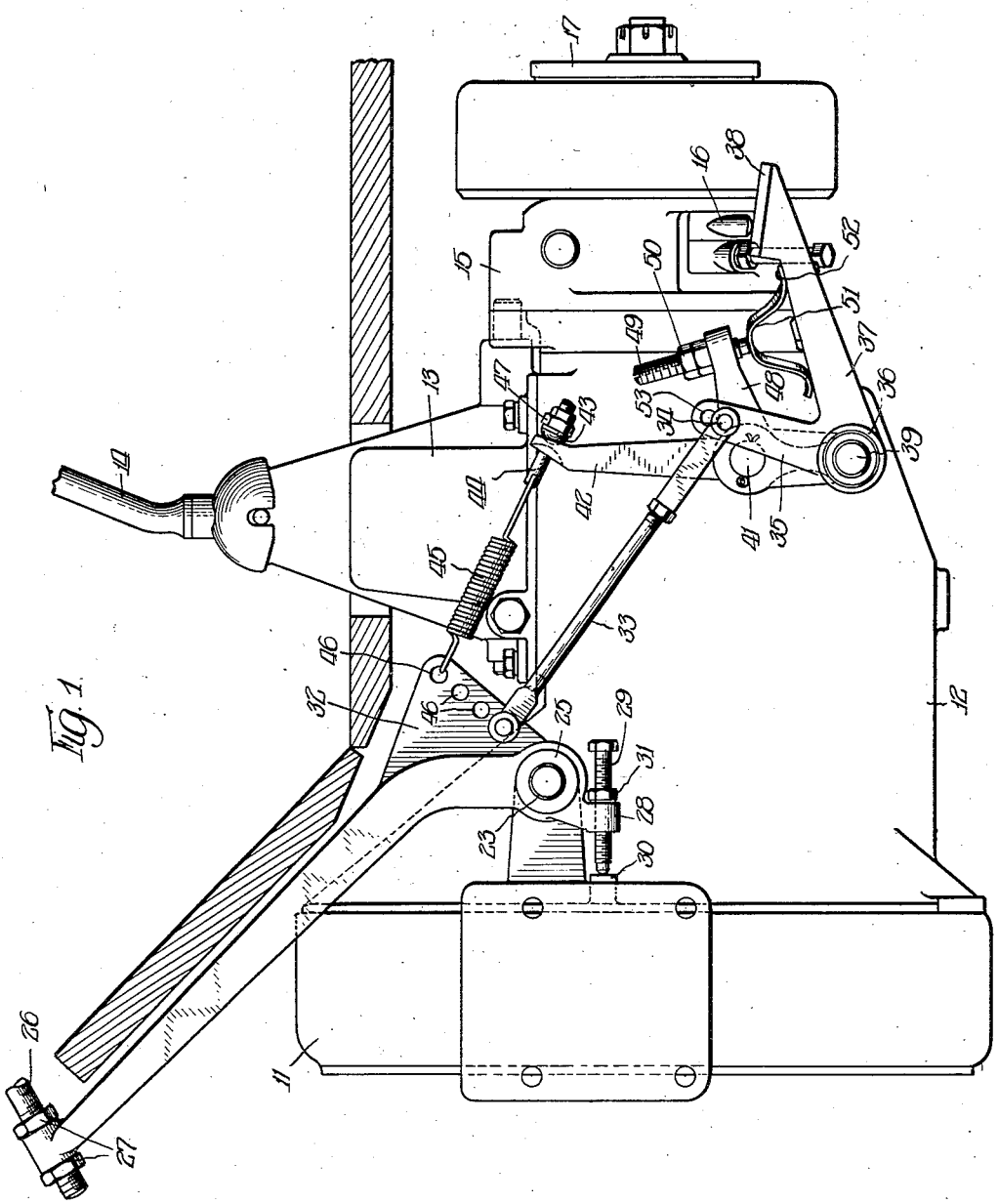
Figure 1 is a fragmentary side elevation of the mechanism in the off position.
Figure 2:
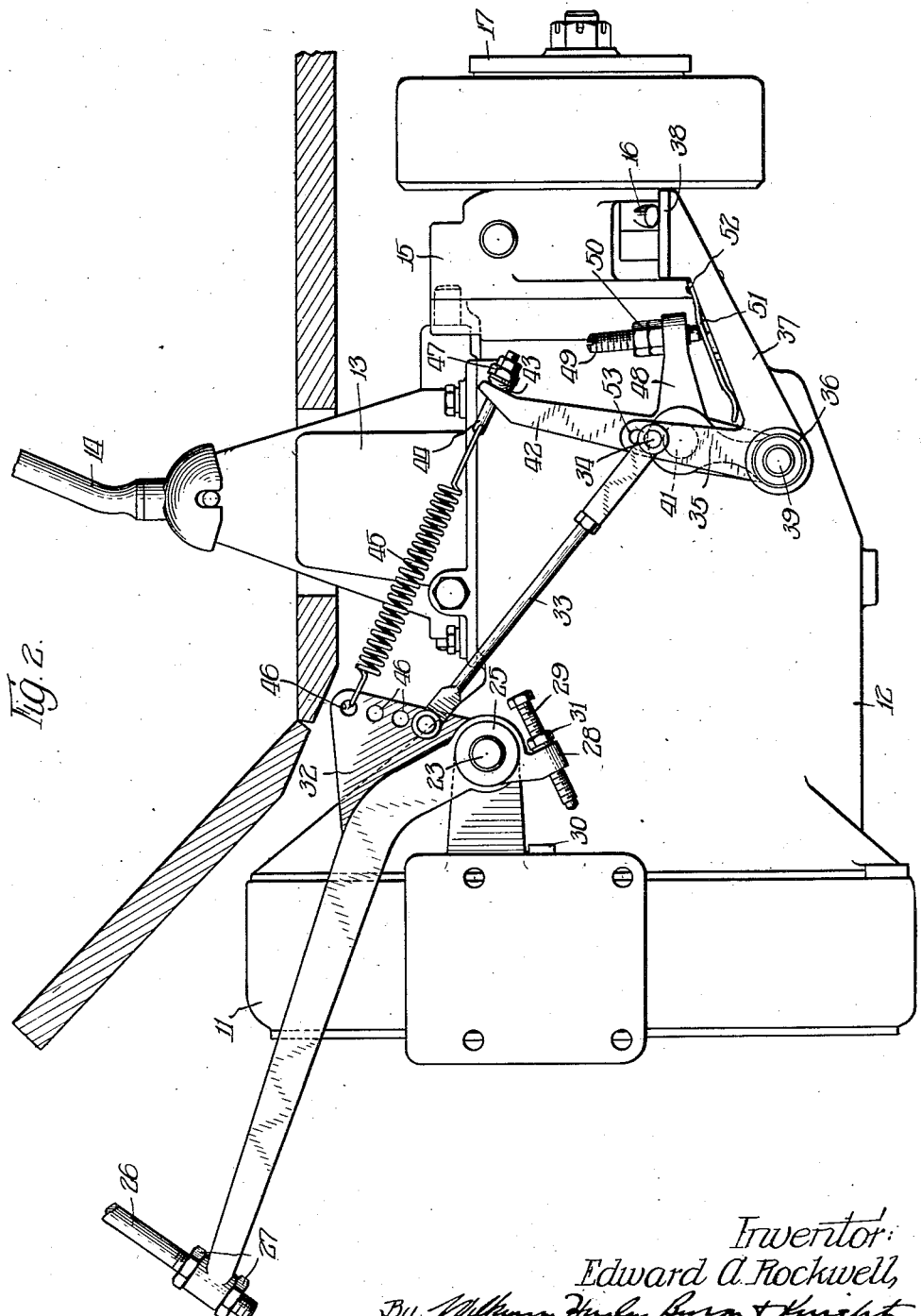
Figure 2 is a view similar to Figure 1, but showing the pedal depressed in brake applying position.

In the drawings, the usual housing for a clutch and fly wheel is shown at 11, and directly connected thereto is a gear housing 12. This housing 12 is shown as provided with an upper closure 13 from which passes any usual type of gear operating lever 14. The apparatus has been shown in connection with a type of power brake applying means covered in my copending application Serial No. 224,846, filed October 8, 1927, and the housing 15 contains such means. The lever arm 16 extending from the housing 15 serves to operate the power device by movement in a clockwise direction, as seen in Figure 3, or in an upward direction as seen in Figures 1 and 2. Any usual type of connection to a propeller shaft may be made at 17.

Referring now to Figure 3, the relation of the several operating means is shown, the starter button 18 being shown as carried on an arm 19 secured on the shaft 20, which latter is secured to the housing 11 by the brackets 21. The accelerator button is shown at 22 and is not connected to the other parts shown, it being shown in the drawing merely to bring out the relation of the several parts. The shaft 23 extends laterally from the housing 12 and carries on its outer end a clutch pedal arm 24 which is shown in Figure 3 only, having been omitted from Figures 1 and 2 for the sake of clearness. It will be understood that inside the casing 12 this shaft 23 may be operatively associated with any desired type of clutch operating mechanism. The brake pedal lever 25 is pivotally supported upon the shaft 23 intermediate the clutch lever 24 and the housing 12. It will be understood that this brake pedal lever moves freely on the shaft and has no connection whatever with the operation of the clutch, the shaft merely serving as a pivot.

The upper end of the brake pedal lever 25 has threaded therein the pedal supporting rod 26 which may be adjusted for height and held in adjusted position by the lock nuts 27. The lever 25 is also provided with the lower extension 28 having an adjustable stop stud 29 threaded therein. This stud is adapted to bear against a stop lug 30 extending from the housing 11 and may be retained in adjusted position by a lock nut 31.

The rear of the lever 25 has an extension flange or fin 32 to which is pivotally connected the brake operating pull rod 33. This rod is in two pieces and is adjustable for length and has its lower end pivotally connected at 34 to the arm 35 of the bell crank lever 36. The other arm 37 of the bell crank lever 36 has its outer end formed with a brake operating surface 38 which is in contact with the end of the brake operating lever 16. The bell crank lever 36 is pivotally supported on a stud 39 which is carried by the intermediate lever 40. This intermediate lever 40 is pivotally supported on a stud 41 which extends laterally from the gear housing 12. It will be understood that this stud is not operatively connected within the gear housing and serves merely as a pivot for the lever 40.

The upper arm 42 of the lever 40 is provided with a socket against which rests the rounded bearing member 43 which is carried by the connector 44. This connector 44 passes through an opening in the upper end of the lever arm 42 and connects to one end of a tension spring 45, the other end of which is hooked into one of a series of perforations 46 in the rearwardly extending web 32 of the brake pedal lever 25. The tension of the spring 45 may be adjusted and locked by means of the nuts 47 carried by the connector 44. By selecting different perforations 46 the lever arm about pivot 23 for pulling on spring 45 may be varied.

The side arm 48 of the intermediate lever 40 has threaded therein the adjustable stop stud 49 which may be locked in adjusted position by means of nuts 50. This stud 49 is adapted to contact with the flat spring 51 which is riveted at 52 to the arm 37 of the bell crank lever 36 as shown in Figure 2. The stud 49 may be adjusted so as to normally be out of contact with the spring 51 or may be adjusted to give any desired initial compression to spring 51. It will be noted that a plurality of perforations 53 are provided in the upper end of the arm 35 of the bell crank lever 36 so that the leverage of the brake pull rod 33 may be varied by using different points of connection.

In operation of the brake pedal to put the brake actuating mechanism into operating position the foot pedal is merely depressed in the usual manner, which causes the lever 25 to move in counterclockwise direction about the shaft 23. At the start of the movement the parts are in the position shown in Figure 1. At the beginning of this downward movement, a pull is transmitted through rod 33 and the upper arm 35 of bell crank lever 36 and tends to swing this bell crank lever in counterclockwise direction about the stud 39. This movement then raises the end of the brake applying arm 16 and brings about the initial application of the brake.

It will be understood that the stud 39 about which this rocking movement of the bell crank lever 36 takes place, is not carried by a fixed part of the machine but by the lower end of the intermediate lever 40. There is a tendency then through the pull of the rod 33 to not only rock the bell crank 36 about the stud 39 in counterclockwise direction, but also to rock the intermediate lever 40 in a clockwise direction about its pivot shaft 41. This latter tendency, however, is counteracted by the resistance of the spiral coil spring 45 which also has its tension increased since it is connected to the web 33 of the pedal lever 25 and is therefore stretched at the same time that the pull is applied through the pull rod 33.

The bell crank lever 36 will continue to swing in counterclockwise direction about the stud 39 and as the movement increases, some movement of the intermediate lever 42 about its pivot point 41 also may take place. These movements being in contrary directions, the stop stud 49 compresses the flat spring 51 and as this spring is fully depressed, the independent movement of the two levers is halted and they must move as a unit. The simultaneous action of springs 45 and 51 causes the spring 51 to modulate the action of spring 45.

For any further brake operating movement, both levers move jointly, and this movement must be in a counterclockwise direction in order to give the necessary operating movement to the brake applying arm 16. For this additional movement, however, the effective lever arm is very short, since it is no longer the distance from pivot point 34 to the axis of the shaft 39, but merely the distance from the pivot point 34 to the axis of the shaft 41. There is therefore a very much shortened lever arm which is brought into play at the time that the intermediate lever and bell crank lever become locked together for joint movement. This change in lever arm and consequent increase in power required for additional pedal movement is somewhat smoothed out and rendered less abrupt by means of the gradual cushioning flat spring 51.

The bell crank arm 37 has an elongated face 38 engaging the lever 16 and the face 38 will move to the left relative to the lever 16 during the braking movement of the pedal. This sliding movement may take place between lever 16 and face 38 until the bell crank 36 and lever 42 are locked together and move as a unit after the complete compression of spring 51. After this relation has been reached all further movement is in the counter-clockwise direction about the pivot point 41.

The sliding movement between the lever 16 and face 38 will be resisted by spring 45, modulated by the action of the spring 51. The power derived from the depression of the foot pedal will be divided into a component causing a sliding action and one causing a rotation of the bell crank 35. The relation between the two components may be modified by a variation in the angle of the face 38. The power used in the sliding movement does not cause the operation of the brake but is absorbed by the springs and it is thus possible to have any desired stiffness of pedal operation. It is also possible to maintain the brakes applied during a considerable range of pedal travel and to absorb the energy required to cause this brake pedal travel without material modification of the braking affect.

This type of brake operating mechanism is particularly applicable to modern motor vehicles and modern braking systems, and while especially adapted for use with a power device or booster for applying the brakes, it may also be desirable for use in connection with usual types of four-wheel brakes. It will be apparent that by variation in the relation between the pivots and the lengths of the lever arms, the increase in power required may be varied within wide limits. For instance, with a power device the pedal pressure may be as low as 10 pounds in order to operate the pedal through a sufficient range of movement to apply the brakes with all the pressure necessary for normal braking operation. The resistance may then rapidly increase so that a pressure of 100 or 150 pounds may be required for additional pedal movement, such as to apply the brakes with greater force. This large increase in power or pressure requirement is important in preventing too sudden stopping of the car by inadvertently rapid brake application.

For example, if a continuous pressure such as 10 pounds were all that were required to afford the complete range of brake movement, it would be difficult to so graduate the brake pedal movement as to stop the movement short of unnecessarily severe brake application. This is particularly true with power devices where the brake pedal may operate under very light pressure, since the brake operating pressures are provided by the power device. By having a large increase in power requirements the brake pedal may normally be brought down to this point of large power increase for easy stopping, while if a sudden or emergency stop is required, additional braking effort is still available upon the overcoming of the increased resistance of the brake pedal.

While I have shown and described one form of carrying out my invention, by way of example, it is capable of modification and variation to adapt it to various uses and brake installations and I contemplate such changes and modifications as come within the spirit and scope of the appended claims.

I claim

1. A brake mechanism comprising a pivoted brake lever, a pivoted brake applying lever, a second pivoted lever carrying the pivot of the brake applying lever, a link connecting the brake lever and brake applying lever, and a spring connecting the brake lever and second pivoted lever.

2. A brake mechanism comprising a pivoted brake lever adapted for selective movement, a second pivoted lever, a brake applying lever pivoted to the second pivoted lever, a link connecting the brake lever and brake applying levers and a tension spring connecting the brake lever and second pivoted levers.

3. A brake mechanism comprising a pivoted brake lever adapted for selective movement, a second pivoted lever, a brake applying bell crank lever, a brake arm, one arm of the bell crank lever engaging the brake arm, a link connecting the other arm of the bell crank lever and the brake lever, and a spring connecting the brake lever and second pivoted lever and resisting braking movement of the brake lever and also resisting movement of the second pivoted lever in one direction.

4. A brake mechanism comprising a pivoted brake lever, a second pivoted lever having upper and lower arms, a bell crank brake applying lever pivoted to the lower arm of the second lever, a brake arm engaged by one arm of the bell crank lever, a link connecting the other arm of the bell crank lever and the brake lever, and a spring connecting the brake lever and the upper arm of the second lever.

5. A brake mechanism comprising a pivoted brake pedal, a pivoted brake arm, a pivoted brake applying lever having an arm in sliding thrust engagement with said brake arm, a positive link connection between said brake pedal and said brake applying lever, a movable member carrying the pivot of said brake applying lever resiliently resisting the relative sliding movement between said brake applying lever and said brake, the resilient resistance including a resilient connection between said brake pedal and said movable member.

6. A brake mechanism comprising a pivoted brake pedal, a pivoted brake arm, a pivoted brake applying lever having an arm in sliding thrust engagement with said brake arm, a positive link connection between said brake pedal and said brake applying lever, a movable member carrying a pivot of said brake applying lever resiliently resisting the relative sliding movement between said brake applying lever and said brake arm, a resilient resistance comprising resilient means between said movable member and said brake applying lever tending to cause said movable member and said brake applying lever to move as a unit and a resilient connection between said movable member and said brake pedal.

7. A brake mechanism comprising a pivoted brake pedal, a pivoted sub-lever, a pivoted brake applying lever, the pivot of said brake applying lever being carried on an arm of said sub-lever by a pivot of said sub-lever, a positive link connection between said brake pedal and said brake applying lever and a resilient member between said sub-lever and said brake pedal.

8. A brake mechanism comprising a pivoted brake pedal, a pivoted sub-lever, a pivoted brake applying lever, the pivot of said brake applying lever being carried by a pivot of said sub-lever, resilient means between said sub-lever and said brake applying lever urging said levers to move as a unit, a positive link connection between said brake pedal and said brake applying lever and a resilient connection between said brake pedal and said sub-lever.

9. A brake mechanism comprising a pivoted brake pedal, a pivoted brake arm, a pivoted brake applying lever including an arm in sliding thrust engagement with said brake arm, a pivoted sub-lever including an arm carrying the pivot of said brake applying lever, a positive link connection between said brake applying lever and said brake pedal and a resilient connection between said sub-lever and said brake pedal.

10. A brake mechanism comprising a pivoted brake pedal, a pivoted brake arm, a pivoted brake applying lever including an arm in sliding thrust engagement with said brake arm, a pivoted sub-lever including an arm carrying the pivot for said brake applying lever, resilient means between said sub-lever and said brake applying lever normally urging said levers to move as a unit, a positive link connection between said brake pedal and said brake applying lever and a tension spring connection between said brake applying lever and said brake pedal.

Signed at Chicago, Illinois, this 22nd day of May, 1929.

EDWARD A. ROCKWELL.